United States Patent
Robillard et al.

(10) Patent No.: US 6,259,361 B1
(45) Date of Patent: Jul. 10, 2001

(54) TIRE MONITORING SYSTEM (75) Inventors: James P. Robillard, Zeeland; Brian S. Honeck, Holland; James R. Geschke, Holland; Michael J. Suman, Holland, all of MI (US)

(73) Assignee: Prince Corporation, Holland, MI (US)

( * ) Notice: Subject to any disclaimer, the term of this patent is extended or adjusted under 35 U.S.C. 154(b) by 0 days.

(21) Appl. No.: 09/114,539

(22) Filed: Jul. 13, 1998

(51) Int. Cl.[7] ................................................ B60C 23/00
(52) U.S. Cl. ........................ 340/447; 340/442; 340/444; 73/146.2; 116/34 R; 200/61.22
(58) Field of Search ................................. 340/442, 443, 340/444, 445, 447, 438; 73/146.2, 146.8; 116/34 R; 200/61.22

(56) References Cited

U.S. PATENT DOCUMENTS

| | | | |
|---|---|---|---|
| 5,463,374 | 10/1995 | Mendez et al. .................. | 340/447 |
| 5,540,092 | 7/1996 | Handfield et al. ............... | 73/146.5 |
| 5,600,301 | 2/1997 | Robinson, III .................. | 340/442 |
| 5,612,671 | 3/1997 | Mendez et al. .................. | 340/447 |
| 5,661,651 | 8/1997 | Geschke et al. .............. | 364/424.04 |
| 5,760,682 | 6/1998 | Liu et al. ....................... | 340/444 |
| 5,764,137 | 6/1998 | Zarkhin ........................... | 340/444 |
| 5,774,048 * | 6/1998 | Achterholt ...................... | 340/447 |
| 5,825,286 * | 10/1998 | Coulthard ....................... | 340/447 |

* cited by examiner

Primary Examiner—Daryl Pope
(74) Attorney, Agent, or Firm—Foley & Lardner (57) ABSTRACT

A tire pressure monitoring system identifies tire locations by recognizing that certain characteristics are unique to front-located tires verses rear-located tires as well as left-side tires and right-side tires. A control circuit is coupled to a temperature sensor and an accelerometer for each tire to receive information processed to discriminate between left and right and front and rear tires, respectively. With this information and a pressure signal, the monitoring system provides the operator with tire location and pressure information without reprogramming upon tire rotation. The system also alerts the operator to run-flat tire operational constraints.

14 Claims, 5 Drawing Sheets

TIRE DISTINCTION

| FRONT LEFT | FRONT RIGHT |
|---|---|
| LARGE Tfinal−Tinitial<br><br>CONNECTION A&C, THEN A&B, THEN B&C | LARGE Tfinal−Tinitial<br><br>CONNECTION B&C, THEN A&B, THEN A&C |
| REAR LEFT | REAR RIGHT |
| SMALL Tfinal−Tinitial<br><br>CONNECTION A&C, THEN A&B, THEN B&C | SMALL Tfinal−Tinitial<br><br>CONNECTION B&C, THEN A&B, THEN A&C |

TIRE MONITORING SYSTEM

BACKGROUND OF THE INVENTION

The present invention relates to a tire pressure monitoring system for a vehicle and particularly one which can identify the location of a tire without reprogramming upon rotation of tires on the vehicle.

The utilization of tire pressure monitors has been described in numerous patents in which tire pressure sensors have been mounted in the wheel, attached to the valve stem, or embedded in the tire itself. Such systems typically use a sensor and associated circuit for each tire which transmits a modulated radio frequency signal to a receiver in the vehicle for sending information indicating when the pressure of a tire has reached a predetermined low threshold. The receiver and associated circuitry, upon receipt of information indicating a low pressure condition, provides the driver with an alerting signal to the low tire pressure condition. Many systems utilize a tire pressure sensor and transmitter which uniquely identify each tire with an identification code also transmitted to the receiver such that not only is the operator made aware of the existence of a low pressure condition in one of the tires, the tire location is also identified. U.S. Pat. No. 5,661,651 discloses one such system in which the frequency of the transmitted signal identifies the tire. In other systems, a binary code identifying each tire is employed.

A problem with such systems occurs upon the rotation of tires, which is recommended on a frequent basis by many tire or vehicle manufacturers. Thus, tires are rotated from front to rear, from side to side, or both to promote even wear. In such case, a tire which originally was identified to the operator as being located, for example, on the left front of the vehicle may now be located on the right rear and a system which identifies tire location would now indicate a tire problem at the wrong location to the vehicle operator. It has been suggested that this problem can be overcome by reprogramming the tire location as suggested by, for example, U.S. Pat. No. 5,463,374 where it is necessary to manually place a strong magnet near each of the remote wheel-mounted transmitters upon rotation of a tire to reidentify the location of the tire. This not only requires a manual step of having the operator or service personnel place a magnet near each tire, it also requires the tire-mounted transmitter to include a magnetic switch as part of the mechanism, thereby adding to the cost, reliability and complexity of the overall system. Other approaches also suggest the use of a service tool which must be manually coupled to each tire to reprogram the tire location upon rotation of the tires.

Thus, with existing systems, the rotation of tires on a vehicle requires intervention, typically with service personnel or by an operator sufficiently skilled to reprogram the tire location, so that the monitoring system can recognize the new location of a tire. There exists a need, therefore, for a system which allows rotation of tires on a vehicle and which automatically identifies the new tire location to the system display and monitor.

With the introduction of "run-flat" tires, a new tire related problem has also been introduced, namely, the requirement that an operator only drive on a "run-flat" tire for about fifty miles at a maximum speed of 55 mph. There is a need also, therefore, to notify a driver that a "run-flat" tire has lost its pressure and alert the driver to the speed and distance limitations upon such occurrence.

SUMMARY OF THE PRESENT INVENTION

The system of the present invention allows for tire location identification by recognizing that certain characteristics are unique to front-located tires verses rear-located tires as well as left-side tires and right-side tires. It has been discovered that, when a vehicle is in operation, front tires typically have a higher operating temperature than rear tires. Thus, by sensing tire temperature information, such information can be employed to discriminate between front-mounted and rear-mounted tires. Additionally, sensors can be provided which distinguish between left- and right-side mounting of wheels. One such sensor can be an accelerometer-type device which, when a vehicle accelerates, makes contact with two of three contacts and, when the vehicle decelerates, makes contact with a different two of three contacts. When such a sensor is mounted on a left-side wheel of the vehicle, upon acceleration, one set of contacts are closed, however, when the same type of sensor is positioned in the same location on a wheel on the right side, the other set of contacts are closed. With this information, therefore, the signal generated by such sensors can be employed to discriminate between left- and right-side mounted tires. With the information provided by these sensors, a control circuit can identify each tire's location and provide the operator with accurate pressure information for each tire. By coupling the control circuit to the vehicle's speed and distance signal information, typically available on the vehicle bus, "run-flat" warning signals can also be provided to the vehicle operator.

These and other features, objects and advantages of the present invention will become apparent upon reading the following description thereof together with reference to the accompanying drawings.

DETAILED DESCRIPTION OF THE PREFERRED EMBODIMENT

Figure 1:
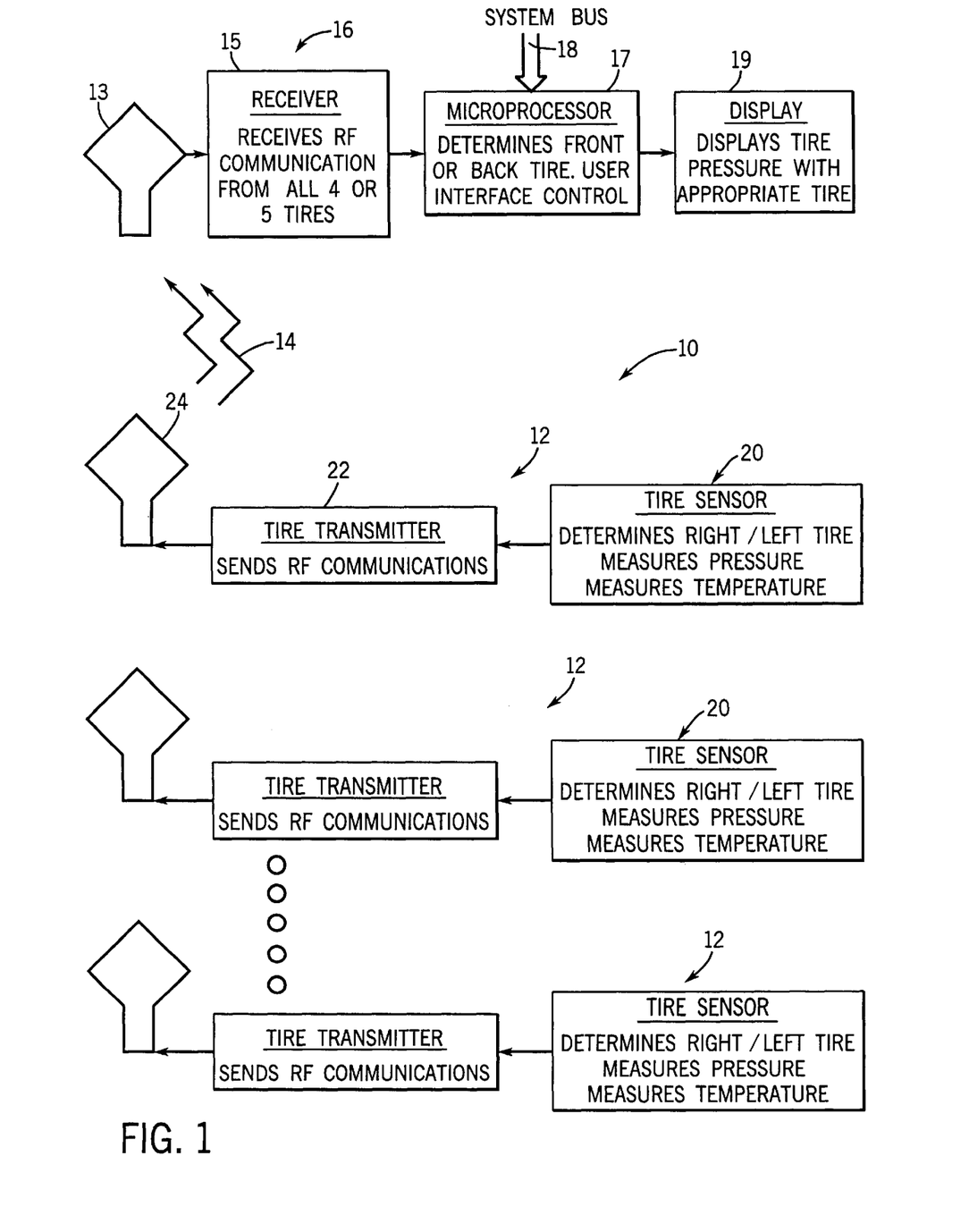
FIG. 1 is an electrical circuit diagram in block form of the tire pressure monitoring system of the present invention.

Referring initially to FIG. 1, there is shown a tire pressure monitoring system 10 of the present invention which includes a plurality of vehicle wheel-mounted sensor control circuits 12, each of which are substantially identical and are mounted to each of the vehicle wheels, preferably in the valve stem. In a typical vehicle, at least four such sensor control circuits 12 are employed and, in some vehicles, an additional one may be employed in connection with a spare tire. Each of the circuits 12 provides a modulated RF tire pressure information signal 14 to the vehicle-mounted receiving and control circuit 16 which receives signals from each of the transmitter circuits 12, demodulates the information and provides a display to the vehicle operator of the status of each of the tires being monitored. Each of the circuits 12, thus, includes tire sensor circuit 20 (shown in detail in FIGS. 2 and 3) and an RF transmitter 22 for transmitting an RF signal (typically at a frequency of 315 MHz or in that frequency band) which is modulated with a multiple bit code identifying not only the particular tire but also the location of the tire as described in greater detail below. Coupled to the output of each of the transmitters 22 is a transmitting antenna 24 for transmitting the modulated RF energy from each of the wheels being monitored to a receiving antenna 13 associated with the vehicle's monitor and control circuit 16.

Circuit 16 further includes a receiver 15 coupled to antenna 13 for receiving the information transmitted by each of the circuits 12 for demodulating the RF energy and for providing a binary bit stream to a microprocessor 17 also coupled to the vehicle system bus 18 for receiving not only tire pressure information from receiver 15 but also speed and distance information from the vehicle system bus. Microprocessor 17 has an output coupled to a display 19 which can be a graphic display such as a plan view illustrating the position of each of the tires to the operator with the tire pressures displayed numerically immediately adjacent each tire. Alternately, it can be an alpha/numeric display displaying, for example, LF for left front and the tire pressure, such as 32 psi, adjacent the tire identification. Display 19 can be an LCD, a vacuum florescent, or any other suitable display commonly employed in the automotive industry. System 10, therefore, provides to the vehicle operator a visual display of the location of each of the tires on the vehicle as well as the status of the tire pressure and, with the interconnection to the system bus 18 with run-flat tires, provides a suitable display, such as a flashing LED or a counter which decrements a fifty-mile limit display to the operator, indicating the limits of use of a run-flat tire. Microprocessor 17 may also provide, upon the occurrence of a flat in a run-flat tire, a speed limiting alarm, either audio or visual, to warn the driver that the 55 mph speed limit has been reached. The tire sensor circuit 20, which is capable of discriminating between front and rear and left- and right-side mounted tires and, therefore, provides tire location information to circuit 16 regardless of the rotation or changing of tires, is now described in connection with FIGS. 2 and 3.

Figure 2:
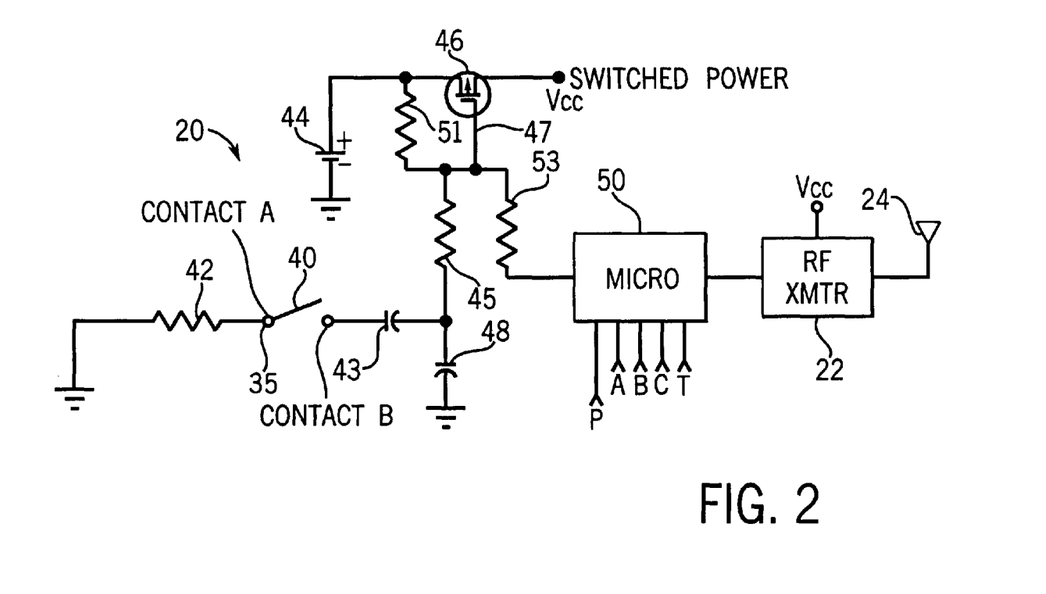
FIG. 2 is an electrical circuit diagram in block and schematic form of part of the sensor circuit shown also in FIG. 3.
Figure 3:
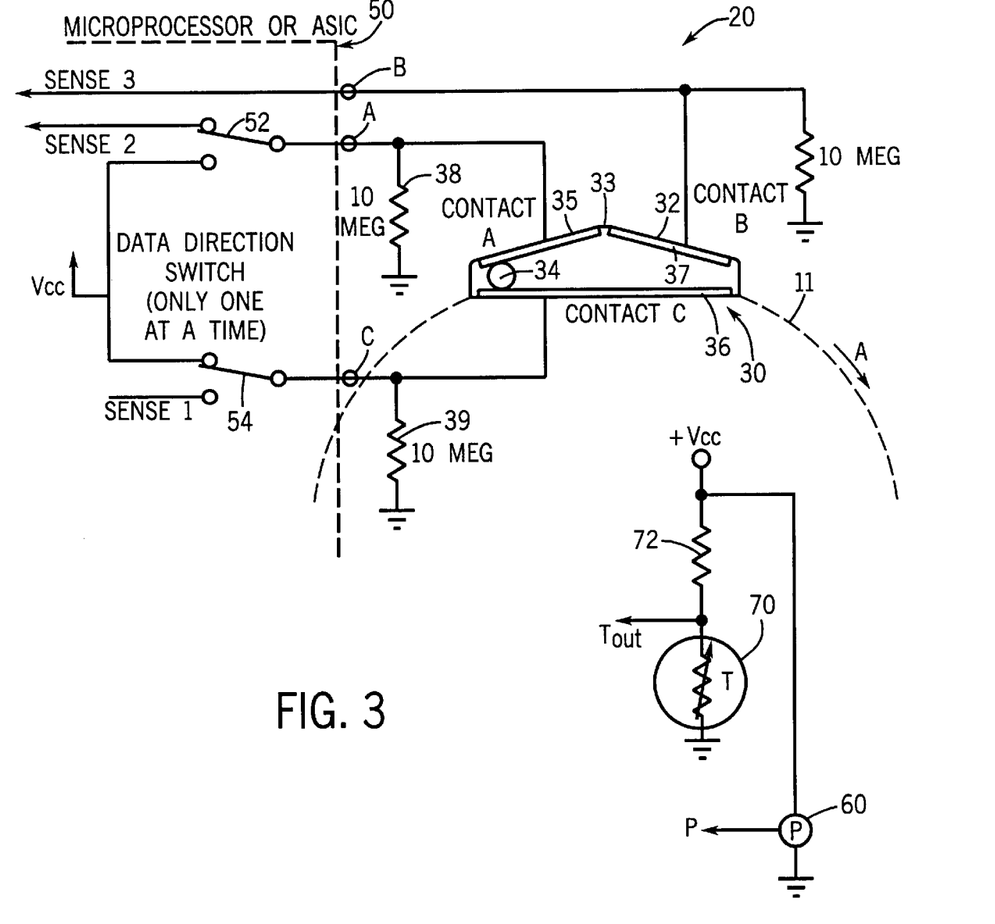
FIG. 3 is an electrical circuit diagram in schematic form, showing a portion of the sensor circuit which is associated with each of the vehicle's wheels.

Referring now to FIGS. 2 and 3, the sensor circuit 20 includes an acceleration/deceleration sensor 30, which is shown schematically in FIG. 3 and which is mounted to each of the wheels 11 of the vehicle, as is the circuit 20. By mounting the circuit and sensor in a valve stem of a wheel, it communicates with the tire pressure within the tire as well as the ambient temperature surrounding the tire and wheel. The valve stem-mounted pressure sensor microprocessor and transmitter, together with the batteries employed therewith are included in an ASIC (application specific integration circuit), which is modified as described below, but otherwise is a tire pressure sensor and transmitter commercially available from the Schrader Bridgeport Company. The accelerometer sensor 30 is added to the commercially available circuit board. As is schematically shown in FIG. 3, the accelerometer comprises a housing 32 into which a rolling conductive ball 34 is mounted with a floor defining a contact 36 (contact C) and a pair of inclined contacts 35, 37 (contacts A and B, respectively) in spaced relationship to one another with a gap 33 which can be selectively bridged by ball contact 34 when the centrifugal force of the rotation of wheel 11 is sufficient to cause the ball 35 to roll along the surface of contact 35 until it bridges gap 33 between contacts 35 and 37. As can be appreciated, the accelerometer and decelerometer sensor 30 is mounted to a vehicle wheel 11, as shown schematically in FIG. 3 such that upon initial acceleration (in a direction indicated by arrow A in FIG. 3), ball 34 moves rearwardly into the position shown in FIG. 3, making contact with contacts 35 and 36. Upon reaching a near steady state velocity, the ball 34 rolls up into gap 33 making contact between contacts 35 and 37. Upon deceleration in a direction opposite arrow A in FIG. 3, ball 34 rolls to the opposite side as shown in FIG. 3 and makes the contact between contacts 37 and 36. By mounting the sensor 30 on each of the wheels, this sequence of operation, which normally occurs when the car begins movement and subsequently slows, will provide an opposition sequence of contacts for left- and right-side mounted tires. This information, therefore, can be used to discriminate between left- and right-side tires, as described in greater detail below in connection with FIGS. 4 and 5.

Contacts 35 and 37 (A and B), thus, define a switch 40 shown schematically in FIG. 2, which is coupled to ground through contact 35 by means of a resistor 42. The sensor circuit 20 includes a lithium battery 44 which supplies a voltage Vcc through a unijunction transistor 46 controlled by switch 40 by grounding the gate 47 of transistor 46, upon closure of switch 40 when gap 33 is bridged by a conductive ball 34, shown in FIG. 3. This switch closure is coupled to gate 47 of transistor switch 46 by means of a coupling capacitor 43 and an RC circuit including resistor 45 and capacitor 48 coupled from the gate 47 of transistor 46 to ground as shown. Power from battery 44 is continuously applied to microprocessor 50 of the sensor circuit 20 by means of a pair of serially coupled resistors 51 and 53, such that the microprocessor 50 is always powered. The microprocessor typically includes a power-saving sleep mode and wakes up when the voltage Vcc is applied to the sensor circuit upon activation of the switch 40 by movement of the vehicle. This feature provides power saving for the lithium battery 44 and allows the circuit to provide temperature and pressure information upon application of the switched voltage Vcc to the sensing circuit that is shown in FIG. 3.

Microprocessor 50 receives input signals from sensor 30 from contacts A, B and C (35, 37 and 36), as shown in FIGS. 2 and 3, as well as pressure information "P" from a pressure transducer 60 and a temperature transducer, such as thermistor 70 (FIG. 3). This information is digitized and applied to modulate the signal from an RF transmitter 22 coupled to Vcc for receiving operating power therefrom and to an antenna 24 for transmitting the tire pressure, temperature, and sequence of contacts between switch contacts A, B and C to the vehicle's receiving and monitoring circuit 16, which demodulates the information, as described in connection with FIGS. 4–6, to identify each of the tire's location as well as their pressure.

The sensor circuit 20, as seen in FIG. 3, includes output terminals A, B and C associated with contacts A, B and C (35, 37 and 36, respectively) coupled to the input terminal of microprocessor 50, as shown in FIG. 2. Contact 35 is coupled to ground through a resister 38, while contact 36 is coupled to ground through a resistor 39. The microprocessor 50 sequentially interrogates the status of switch 30, as graphically illustrated by the switches 52 and 54 in FIG. 3, to sequentially generate a binary code indicating the AC connection, the AB connection and the BC connection with the AC connection being illustrated in FIG. 3. Thus, for the AB connection, switch 52 would be moved to a downward position from that shown such that the power would be applied to contact A and, when the AB contact is made, a logic "1" signal would be provided on output terminal B in FIGS. 2 and 3. Switches 52 and 54 are internal solid state switches contained within the microprocessor, which is programmed to sequentially interrogate the status of each of the contacts 35, 37 and 36 and their relationship to one another. Switches 52 and 54 are only graphic illustrations of this operation of the microprocessor, which is controlled by a conventional subroutine added to the commercially available program for digitizing pressure information from pressure sensor 60.

Pressure sensor 60 is coupled to the switched power Vcc circuit from transistor 46, as shown in FIG. 3, to provide a pressure indicating signal "P" to the microprocessor. The thermistor 70 is coupled to Vcc through a voltage divider circuit including a resistor 72 to provide temperature signal "T" applied to input terminal T of microprocessor 50, as shown in FIG. 2. The microprocessor 50 provides a serial bit stream of modulated binary bits at an RF frequency of approximately 315 MHz, providing tire pressure and temperature information as well as the sequence of closure of contacts of switch 30, which is transmitted by antenna 24 to the vehicle's monitoring circuit 16 which receives the signals via antenna 13 (FIG. 1).

The receiving circuit 16 includes an RF receiver 15 which receives transmission from all of the tires. Each of the transmitters 22 may be a different frequency with receiver 15 including a separate channel for each of the transmitters 22. Preferably, the bit steam from each of the sensor circuits 20 uniquely identifies that sensor and the location of the sensor and, therefore, the tire on the vehicle. The transmission format includes 22 bits identifying the sensor and its detected pressure. The number of bits is relatively high so that vehicles adjacent to one another do not interfere with their respective transmission of tire pressure information. Two additional bits are included to provide temperature information and three additional bits are provided to provide the sequence of operation of switch 30 to the transmitted signal information.

As noted in the background, it was discovered that the front tires, when the vehicle has been in operation for five to ten minutes, typically run at a higher temperature than the rear tires. This is due in part to the mass of the engine being located centrally between the tires and generating additional ambient heat as well as the fact that the turning of the vehicle in its operation also generates more heat in the front tires, typically, than in the rear tires. Thus, it is not uncharacteristic for the front tires to run anywhere from 10° to 15° higher than the rear tires during vehicle operation. This fact is employed by the system of the present invention to provide a discrimination between front and rear tires. As discussed above, the determination between left- and right-side tires is accomplished utilizing the accelerator/decelerator sensing switch 30 and the sequence of closure of the contacts A, B and C, thereof, for each of the wheels.

Figure 4:
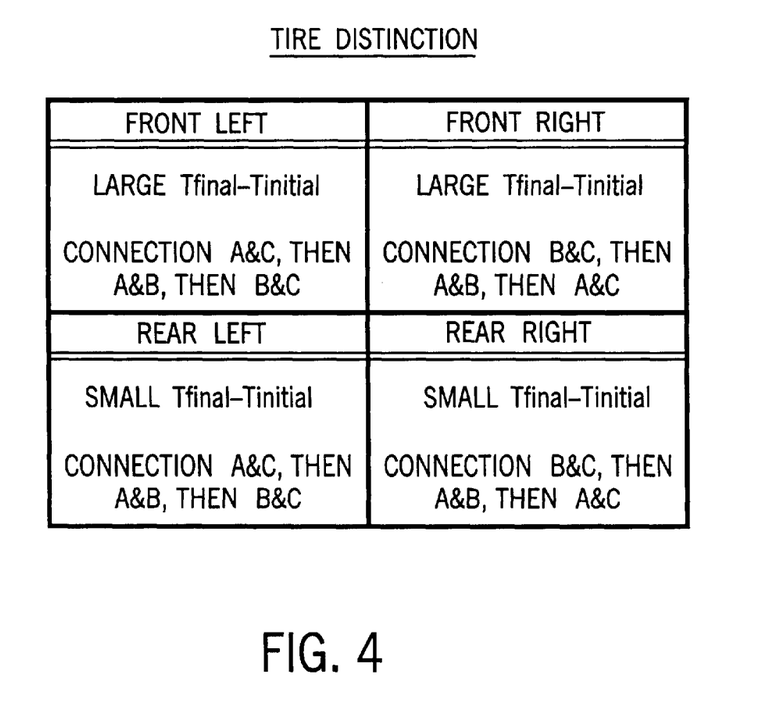
FIG. 4 is a table illustrating the discrimination information provided by the sensors and circuit of FIGS. 2 and 3.

Tire discrimination is shown in FIG. 4, where the change in temperature in the front tires is relatively large between an initial cold condition and while running, while the Delta (Δ) "T" temperature differential in the rear tires is relatively small. The sequence of connections between contacts A, B and C discriminate between left- and right-side tires. The left-side tires provide a sequence AC initially, AB then BC, as seen in the diagram of FIG. 4. The right-side mounted tires, on the other hand, provide a sequence of BC, AB and AC due to the difference in the contacts upon acceleration and deceleration when the sensor is mounted on the left- or right-side of the vehicle. This information is sufficient to uniquely identify the location of each tire and provide such information to the vehicle operator. The microprocessor 17 in the vehicle control and monitor circuit 16 is programmed to analyze the transmitted information of signals 14 from each of the tires to make such a determination and to display the results to the vehicle operator. The programming of the microprocessor to detect the tire location is illustrated by the program flow diagrams of FIGS. 5 and 6 now briefly described.

Figure 5:
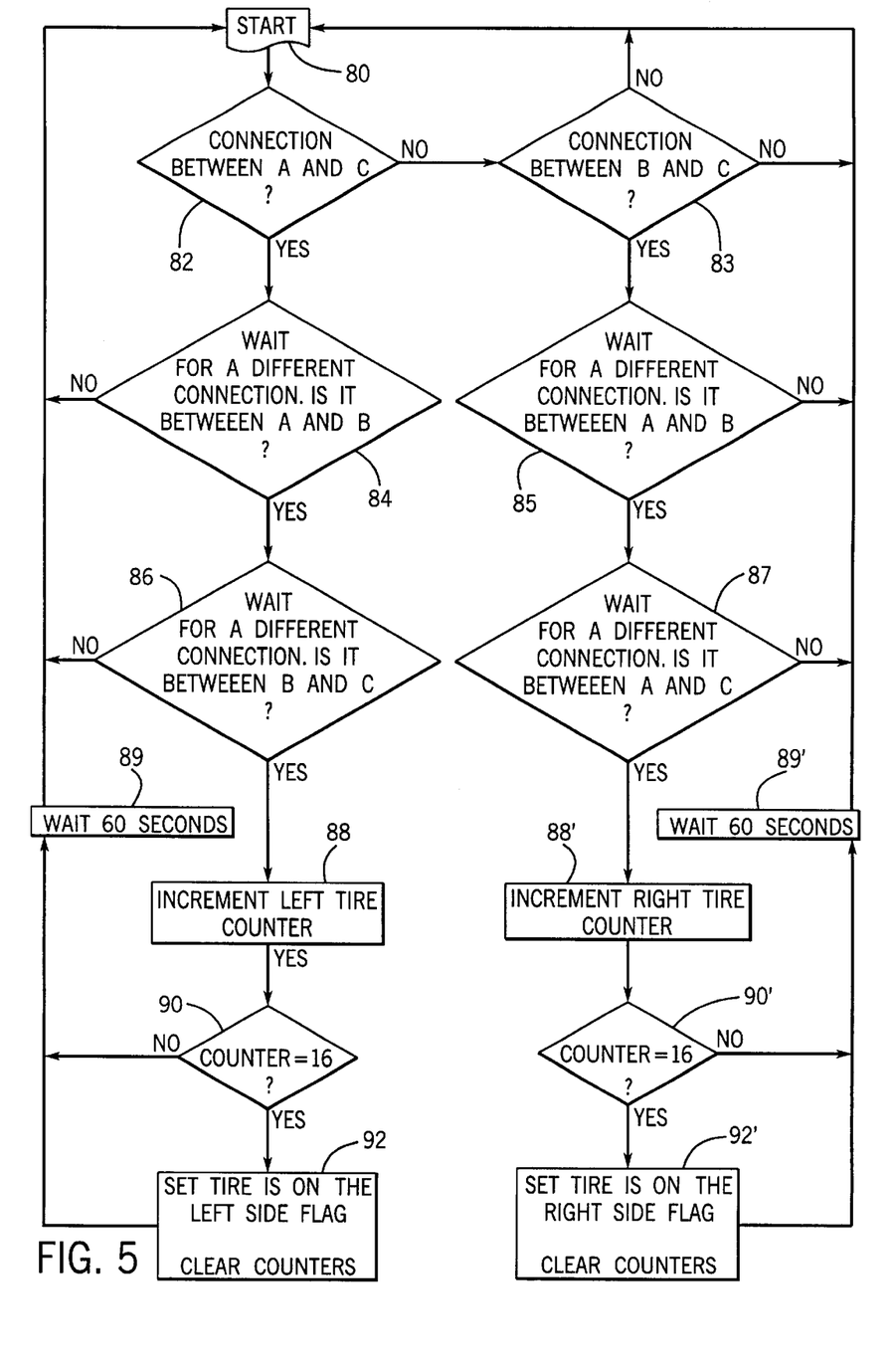
FIG. 5 is a flow diagram of the programming of the microprocessor for discriminating between right- and left-side tires.

In FIG. 5, the right and left tire distinction based upon the sequence of contacts of switch 30 is described beginning at start block 80. Test block 82 determines initially whether there has been a contact made between contacts A and B of switch 30. If, for example, the tires are located on the left side, such a connection is made upon acceleration of the vehicle and the program moves to block 84, where it waits to detect a different connection and whether the different connection is a contact between A and B indicating that the vehicle has now reached an operational speed. If it does not occur, the program loops through blocks 80, 82 and 84 until it does, in which case the program moves to block 86, where it waits until a different connection is made and detects whether it is a contact between switch contacts B and C. If no contact between B and C has yet occurred, the program loops through blocks 80, 82, 84 and 86 until the sequence has been detected. Once detected, it increments a left tire counter as indicated by block 88. Once the sequence has been detected, it continues to determine whether the sequence has occurred and, if it has, for sixteen cycles as indicated by block 90, a flag is set as indicated by block 92, indicating that the detected tire is a left-side tire. If sixteen cycles have not been detected, between each cycle there is a one-minute delay, as indicated by block 89. This provides sufficient driving time of sixteen minutes for the tires to warm up and provides not only the left/right discrimination but also the front/rear discrimination information accurately to the microprocessor and subsequently provides accurate displayed information to a vehicle operator.

If the connection between A and C does not first occur as indicated by block 82, the program moves to block 83 to determine if the connection exists between B and C, indicating a possible right-side tire detection. If a connection between B and C is detected, the program moves to block 85 to determine whether a connection exists between A and B and, if not, the program cycles through blocks 80, 82, 83 and 85 until a connection between A and B exists, indicating that the right-side tire is likely. If a connection between A and B is detected by the movement of ball 34 to the AB position indicating the vehicle is in motion, the program awaits a connection between A and C, as indicated by block 87, and cycles through the blocks until such switch transition occurs. When this occurs, the right tire counter 88' is incremented and by block 90' this count is compared with a preset count of sixteen to determine whether sixteen cycles of sequence of switch operation has been detected. If not, the sixty-second delay 89' is inserted in the program and the program again loops through blocks 80 through 90'. Once sixteen loops have occurred, a flag is set as indicated in block 92' indicating that the tire is on the right side of the vehicle, and counters 88 and 88' are cleared. The microprocessor simultaneously looks at information from each of the four tires, cycling through a similar routine as that shown in FIG. 5 for each of the four tires of a passenger vehicle.

Figure 6:
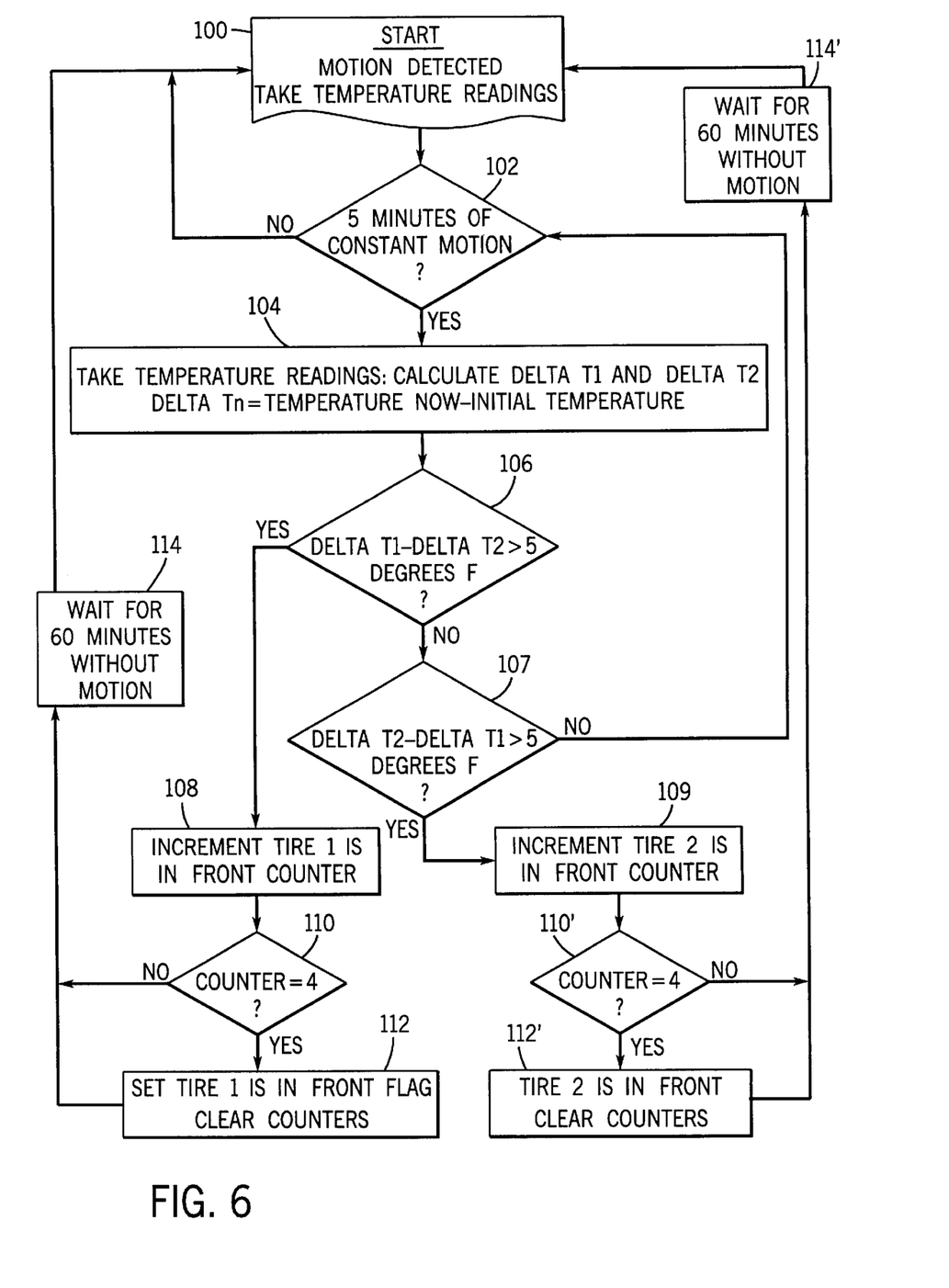
FIG. 6 is a flow diagram of the microprocessor program employed to discriminate between front and rear tires.

Simultaneously the microprocessor program runs a subroutine, as shown in FIG. 6, which includes a start block 100 initiated once switch A and B is made and the vehicle is in operation. The program then tests at block 102 to determine whether or not the vehicle has been in motion for five minutes to provide time for the tires to warm up and, if not, cycles through blocks 100 and 102 until the five-minute timer has expired. Upon expiration of the five-minute clock, the program looks at all the temperature information as indicated by block 104 and determines the difference for each tire between the initial tire temperature upon starting (indicated by block 100) and after five minutes of operation. The change for each tire is identified in the flow diagram as Delta T1 for tire one and Delta T2 for tire two with the Delta temperatures extending through Delta Tn, with the n representing the number of tires. The program then tests the difference between each of the tire temperatures, as indicated by block 106, to determine if the temperature difference from the initial temperature reading for each of the tires and their subsequent temperature and such difference between two different tires is greater than 5° F., as indicated by block 106. Thus, as illustrated by block 106, the change of temperature of T1 is subtracted from the change of temperature in T2 to determine if the difference between the two changes in tire temperatures is greater than 5°. If it is, it is a representation that a front tire is being compared with a rear tire and, for the example shown in FIG. 6, T1 is a front tire as determined by block 108 and a front tire counter is incremented one count.

The program then proceeds to block 110 to await such calculations before setting a tire flag as indicated by block 112. If four cycles have not been detected, indicating that tire one is a front tire, the program goes to a sixty-minute timer 114 to allow the tires to cool down to an equilibrium state before retesting. The four-cycle temperature differential is provided to reliably identify a front or rear tire. If in block 106 the difference in temperature differences between two adjacent tires being tested is not 5° as indicated by block 107, the program reverses the test to determine whether tire two is a front tire. If the differences in pressure between T1 and T2 as tested in block 107 indicates greater than 5°, the increment two tire is the front tire counter 109 is set and upon receiving four cycles of such information, as shown by counter 110' a set tire two is in front flag is set as indicated by block 112'. The counters for four cycles is then reset. If four cycles have not been received, a sixty-minute delay (block 114) is inserted to allow the tires to reach an equilibrium temperature. As illustrated in FIG. 6, only the differences between temperatures in tire one and tire two are being compared, it being understood that for each of the four tires a comparison is made to discriminate between front and rear tires. In a passenger vehicle, the front tires and rear tires have distinguishable operating temperature differences with the differences between the differences reliably being greater than 5° F. Thus, with the system of the present invention, a tire monitoring system is provided which discriminates between front and rear and left- and right-side tires, thereby providing the vehicle monitoring circuit with a signal which can uniquely identify the location of a tire regardless of whether it has been rotated on the vehicle without reprogramming the microprocessor or the sensor located within the tire or wheel.

Additionally, the microprocessor 17 of the vehicle monitoring circuit is coupled to the system bus 18, as shown in FIG. 1, and, when run-flat tires are employed, the pressure signal indicating that one of the tires has become flat is applied by the monitor circuit 12 to the microprocessor 17 together with an identification of the tire. Upon receipt of such a signal, the microprocessor processes the speed information from the vehicle bus as well as the odometer information from the vehicle bus and provides a signal to the display 19 that the speed should be limited to 55 mph, such as by flashing a warning light or audible signal if that speed is exceeded. In addition, a fifty-mile counter is set and decremented to provide an additional alarm or alarms as the fifty-mile distance limit is reached to the vehicle operator, also indicating that the life of the run-flat tire is being reached. Thus, the tire pressure monitor and display system of the present invention provides additional safety and operational features not found in other systems and provides a reliable, relatively inexpensive system which does not require specialized service tools or personnel to reprogram the microprocessor upon rotation of the tires.

It will become apparent to those skilled in the art that various modifications to the preferred embodiment of the invention as described herein can be made without departing from the spirit or scope of the invention as defined by the appended claims.

The invention claimed is:

1. A tire pressure monitoring system for a vehicle with multiple tires comprising:

a plurality of pressure sensors, each being associated with a particular tire;

a plurality of temperature sensors, each being associated with a particular tire;

a plurality of transmitters, each being coupled to one of said pressure sensors and to one of said temperature sensors for transmitting pressure and temperature information associated with a particular tire;

a receiver for receiving the information;

a microprocessor coupled to said receiver for determining the relative location of a particular tire based upon the temperature information associated with the particular tire; and a display coupled to said microprocessor for displaying the location and pressure information associated with the particular tire.

2. A tire pressure monitoring system for a vehicle with multiple tires comprising:

a plurality of pressure sensors, each being associated with a particular tire;

a plurality of accelerometer sensors, each being associated with a particular tire;

a plurality of transmitter circuits, each being coupled to one of said pressure sensors and to one of said accelerometer sensors for transmitting pressure and accelerometer information associated with a particular tire;

a receiver for receiving the information;

a microprocessor coupled to said receiver for determining the relative location of a particular tire based upon the accelerometer information associated with the information; and a display coupled to said microprocessor for displaying the location and pressure information associated with the particular tire.

3. A tire pressure monitoring system for a vehicle with multiple tires comprising:

a plurality of pressure sensors, each being associated with a particular tire;

a plurality of temperature sensors, each being associated with a particular tire;

a plurality of accelerometer sensors, each being associated with a particular tire;

a plurality of transmitter circuits, each being coupled to one of said pressure sensors, to one of said accelerometer sensors, and to one of said temperature sensors for transmitting pressure, temperature and acceleration/deceleration information associated with a particular tire;

a receiver for receiving the information;

a microprocessor coupled to said receiver for determining the relative location of a particular tire based upon the temperature and acceleration/deceleration information associated with the information; and a display coupled to said microprocessor for displaying the location and pressure information associated with the particular tire.

4. A method of determining the location of a tire on a vehicle based upon the operating environment of each tire comprising the steps of:

detecting the temperature of each tire over a predetermined time;

calculating the change in temperature of each tire over the predetermined time;

comparing the change in temperature of each tire with the change in temperature of each other tire; and determining the relative location of a tire based upon the change in temperature.

5. The method as defined in claim 4 and further including the steps of detecting and displaying the pressure of each tire.

6. A method of determining the location of a tire on a vehicle based upon the operating environment of each tire, comprising the steps of:

detecting the acceleration/deceleration for each tire; and determining the relative location of the tire based upon the acceleration/deceleration.

7. The method as defined in claim 6 and further including the steps of detecting and displaying the pressure of each tire.

8. A method of determining the location of a tire on a vehicle based upon the operating environment of each tire comprising the steps of:

detecting the temperature of each tire over a predetermined time;

calculating the change in temperature of each tire over the predetermined time;

comparing the change in temperature of each tire with the change in temperature of each other tire;

detecting the acceleration/deceleration for each tire;

determining the relative location of the tire based upon the change in temperature and the acceleration/deceleration; and displaying the location of each tire.

9. The method as defined in claim 8 and further including the steps of detecting and displaying -the pressure of each tire.

10. A tire pressure monitoring system for a vehicle which has a bus providing electrical signals representing vehicle speed and distance traveled, and wherein the vehicle is equipped with run-flat tires comprising:

a pressure sensor associated with each vehicle tire; and a monitoring circuit for receiving signals from said pressure sensors for each tire, said monitoring circuit coupled to a vehicle bus for receiving speed and distance signals from the vehicle bus, said circuit determining when a flat tire has occurred and providing the vehicle operator with speed and distance limitation information with respect to operation of the vehicle when a run-flat tire has lost pressure.

11. The system as defined in claim 10 and further including a display coupled to said monitoring circuit for displaying the miles remaining on a run-flat tire upon occurrence of a flat tire condition.

12. The system as defined in claim 11 wherein said display further displays the speed limit at which the operator can operate the vehicle and provides an alarm if such limit is exceeded.

13. The system as defined in claim 12 wherein said display displays the pressure and location of each tire.

14. The system as defined in claim 13 wherein said system further includes:

a temperature sensor associated with each vehicle tire;

an accelerometer sensor associated with each tire; and wherein said monitoring circuit includes a microprocessor for determining the change in temperature in each tire over a predetermined time and comparing such temperature changes and for determining the sequence of acceleration of each tire over a predetermined time for determining the location of each of the tires on the vehicle.

* * * * *